(12) United States Patent  
Osman

(10) Patent No.: US 8,934,667 B2  
(45) Date of Patent: Jan. 13, 2015

(54) SYSTEM AND METHOD FOR CONFIDENCE-BASED MARKER ADJUSTMENT

(75) Inventor: Steven Osman, San Francisco, CA (US)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 124 days.

(21) Appl. No.: 13/163,892

(22) Filed: Jun. 20, 2011

(65) Prior Publication Data

US 2012/0321130 A1 Dec. 20, 2012

(51) Int. Cl.
- *G06K 9/00* (2006.01)
- *G11B 27/00* (2006.01)
- *H04N 5/76* (2006.01)
- *H04N 19/00* (2014.01)

(52) U.S. Cl.
CPC *G06K 9/00* (2013.01); *G11B 27/00* (2013.01); *H04N 5/76* (2013.01); *H04N 7/26* (2013.01)

USPC .................................................. 382/103

(58) Field of Classification Search
CPC .............................. G06K 9/2054; G06T 19/00
See application file for complete search history.

(56) References Cited

U.S. PATENT DOCUMENTS

| 5,892,554 A  * | 4/1999 | DiCicco et al. ............... 348/584 |
| 6,766,025 B1 * | 7/2004 | Levy et al. ...................... 381/96 |
| 2003/0063292 A1* | 4/2003 | Mostafavi ..................... 356/614 |

* cited by examiner

*Primary Examiner* — Stephen R Koziol  
*Assistant Examiner* — Amandeep Saini  
(74) *Attorney, Agent, or Firm* — Frommer Lawrence & Haug LLP; William S. Frommer; Ellen Marcie Emas

(57) ABSTRACT

A tracking system for improving observability of a marker in an image. The tracking system includes a memory unit that stores data; an imaging unit that images the marker and the image; a processor unit that detects the marker in the image; and a communication unit that transmits and receives data. The processor unit determines a first confidence level indicating a visibility of the marker to a user.

20 Claims, 13 Drawing Sheets

1300

1400

SYSTEM AND METHOD FOR CONFIDENCE-BASED MARKER ADJUSTMENT

BACKGROUND

1. Field of the Invention

This invention relates generally to a system and method for improving observability of a marker in an image. More specifically, the observability of the marker is based on a confidence level of a detection result of the marker.

2. Background Discussion

In many display devices, an image, such as a marker may be displayed that identifies a broadcasting station or entity. This marker may be displayed in a corner section of the display device, such as a television screen. Oftentimes, the marker is not readily visible to a viewer because of the location, dimensions or color of the marker causes it to blend in with the other images being displayed.

SUMMARY

Embodiments of the present invention are directed to methods and apparatus and computer program code for detecting a marker in a display and determining whether an adjustment of one or more properties of the marker would enhance the visibility of the marker.

One embodiment of the present invention is directed to a tracking system for improving visibility (observability, ease of detection based on parameters of the marker, or constituent portions of the marker or components of the marker, such as contrast, distinctiveness, color, shape position and other characteristics) of a marker in image data displayed on a display device. The tracking system includes a memory unit that stores data and a display unit that images the marker and image data. A processor unit detects the marker in the image and determines a confidence level indicating a visibility of the marker to a user.

According to another embodiment of the invention, the processor unit determines the confidence level based on a user input.

Another embodiment of the present invention is directed to the system described above and modifying one or more parameters of the marker, or marker components (size, color, shape, position, brightness) of the marker based on the confidence level.

Another embodiment of the invention is directed to a modification that increases the visibility of the marker.

Another embodiment of the invention is directed to a modification that decreases the visibility of the marker.

According to another embodiment of the invention, the processing unit determines the confidence level based on a learning process.

According to another embodiment of the invention, the processor unit stores, in a memory unit, a history file of the confidence level and associated optical characteristics and/or audio characteristics of the marker.

According to another embodiment of the invention, the processor unit determines the confidence level by comparing optical characteristics of a detected marker with those stored in the history file.

According to another embodiment of the invention, the processor further determines a second confidence level of the marker indicating an audibility of the marker to the user.

According to another embodiment of the invention, the processor determines a third confidence level associated with size of the marker, a fourth confidence level associated with brightness of the marker, a fifth confidence level associated with contrast and/or color of the marker, and a sixth confidence level associated with shape of the marker.

According to another embodiment of the invention, the tracking system further comprises a microphone unit.

Yet another embodiment of the invention is directed to a method for improving observability (visibility) of a marker in an image. The method includes displaying the marker and image data; detecting the marker in the image data; determining a first confidence level indicating a visibility of the marker to a user; identifying whether size, brightness, or contrast affects the first confidence level; and adjusting parameters of the marker based on results of the identifying step to improve the first confidence level.

Yet another embodiment of the present invention is utilizing multiple tracking devices.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Figure 1:
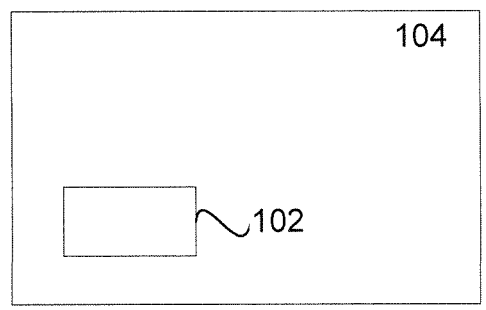
FIG. 1 shows an image of a broadcast program with a marker according to an embodiment of the present invention.

FIG. 1 shows image data 104 being displayed on a display device or unit 100. The display device 100 may be, for example, a TV screen, a monitor, LCD (liquid crystal display) plasma screen, game console display or other image data output mechanism. FIG. 1 shows that content 104, which may be, for example, a television program being broadcasted, image data, or game content or other arrangement of pixels or data representation, is provided on display unit 100. FIG. 1 also shows that a marker 102, which may be for example, a logo of the network provider, advertising information, an identifier or other indicator or indicia, is also displayed on display unit 100 superimposed in image data or content data 104.

As shown in FIG. 1, an embodiment of the present invention includes a marker 102 that may be a logo that may be placed at the lower left corner of an image content 104, which is displayed on a display device 100. Though the logo 102 may be designed to stand out from the screen, it may become unrecognizable when a scene of the program 104 is changed. This lack of recognition may be due to a component of the marker 102. Such components include, for example, shape, color, contrast, size, dimensions or brightness. Embodiments of the present invention track the components of the marker 102 relative to the content 104 to adjust the marker components, and thus the marker, to increase visibility of the maker 102.

Figure 2:
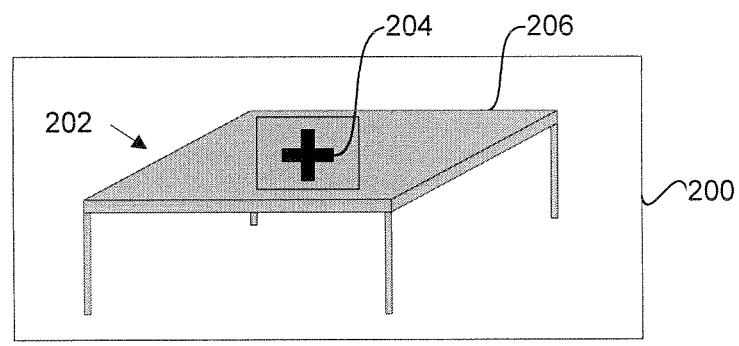
FIG. 2 shows an image of a computer game of augmented reality according to an embodiment of the present invention.

FIG. 2 shows another example of the marker according to an embodiment of the present invention. As shown n FIG. 2, a computer game of augmented reality may utilize a marker, which is typically displayed on top of a background and on which a game is played. When a computer game of augmented reality is played, an image of the environment surrounding a user is taken and is used as a background for a computer game so that the user's experience of the game is enhanced. For example, as shown in FIG. 2, an image 202 of a user's bedroom is taken and displayed on a display 200 of a game console as a background. In the image 202, a marker 204 is shown as placed on a desk 206 that may be used by the user. A chess game or a puzzle game may be displayed and played on the marker 204 by the user. With augmented reality, the user feels as though the game is played in the bedroom. It is noted that the marker 204 may become difficult to be recognized when a game requires an image that has similar visual settings with the marker 204. For example, the surface of the table 206 may have shades or patterns that are similar to the marker 204, causing the marker to be less visible to the viewer.

As described herein, components of the marker include, for example: size, color, shape, pattern, position, brightness, audible sound (i.e., beeping, tone, ringing, alarm and siren) as well as other indicators or identifying properties of the marker.

The visibility or identifiability, of the marker is a quality describing how readily identifiable, or how easily noticed the marker is relative to the background. The background, including audio background, may change so that the marker is less visible or less able to be heard (less "identifiable"). Thus, when the background colors, or audio changes, the marker will also change to maintain or improve the ease of locating the marker (either visual and/or audible). Generally speaking a more easily located marker is a more identifiable marker. This can apply to visual and audible markers.

Figure 3A:
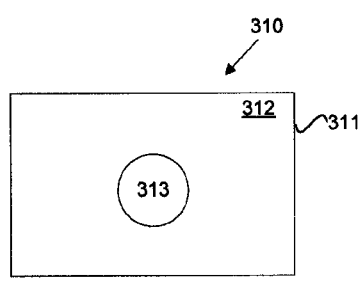
FIGS. 3A-3E show examples of markers displayed on a display unit according to an embodiment of the present invention.

FIGS. 3A-3E shows exemplary markers. For example, as shown in FIG. 3A, a screen may have a display area with a marker 310 a marker may be made of paper or plastic and overlayed, or superimposed on the display area. The physical size of a marker 310 may be such that it can be displayed on a portion or section of a display screen, such as a television, PDA, tablet, laptop etc. Alternatively, the marker may cover, or include the entire display surface. Each marker 310 may have a number that uniquely identifies the marker. Prints on the marker may include a boundary portion 311, a background 312, and one or more predetermined patterns 313. The prints may be black and white or may be color.

Figure 3B:
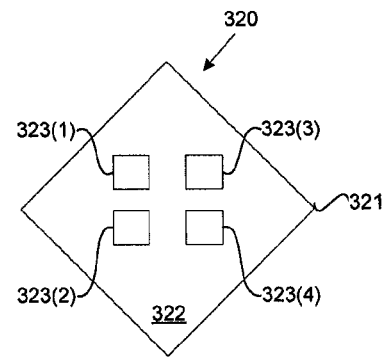

As shown ion FIG. 3B, marker 320 may include boundary 321, background 322 and patterns 323(1), 323(2), 323(3) and 323(4).

Figure 3C:
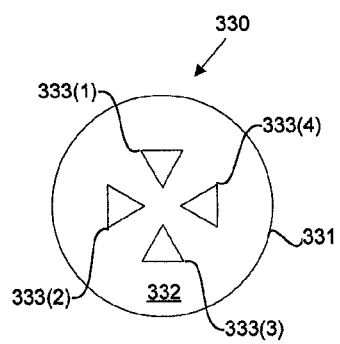

As shown in FIG. 3C, marker 330 may include boundary 331, background 332 and patterns 333(1), 333(2), 333(3) and 333(4).

Figure 3D:
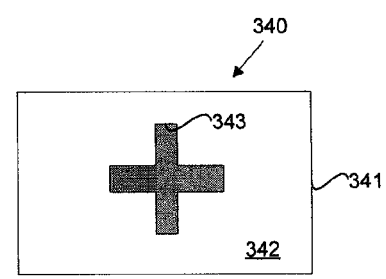

As shown in FIG. 3D, marker 340 may include boundary 341, background 342 and pattern 343.

Figure 3E:
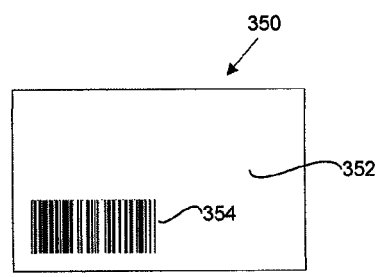

As shown in FIG. 3E shows the marker 350 may include a barcode 354. The background may be as shown by element 352, or alternatively, the barcode 354 may be displayed directly on the display without a separate background. The barcode 354, when used as a data-storage mechanism, may include encoded information that may store encoded information. The barcode marker 354 may be scanned by a user using a scanning device to retrieve or access the stored information. This barcode embodiment may be used when a user desires to scan or otherwise obtain information from the marker. The components or features, such as size, color, contrast, darkness may be modified such that the barcode 354 may be readily discernable on the display.

Figure 12:
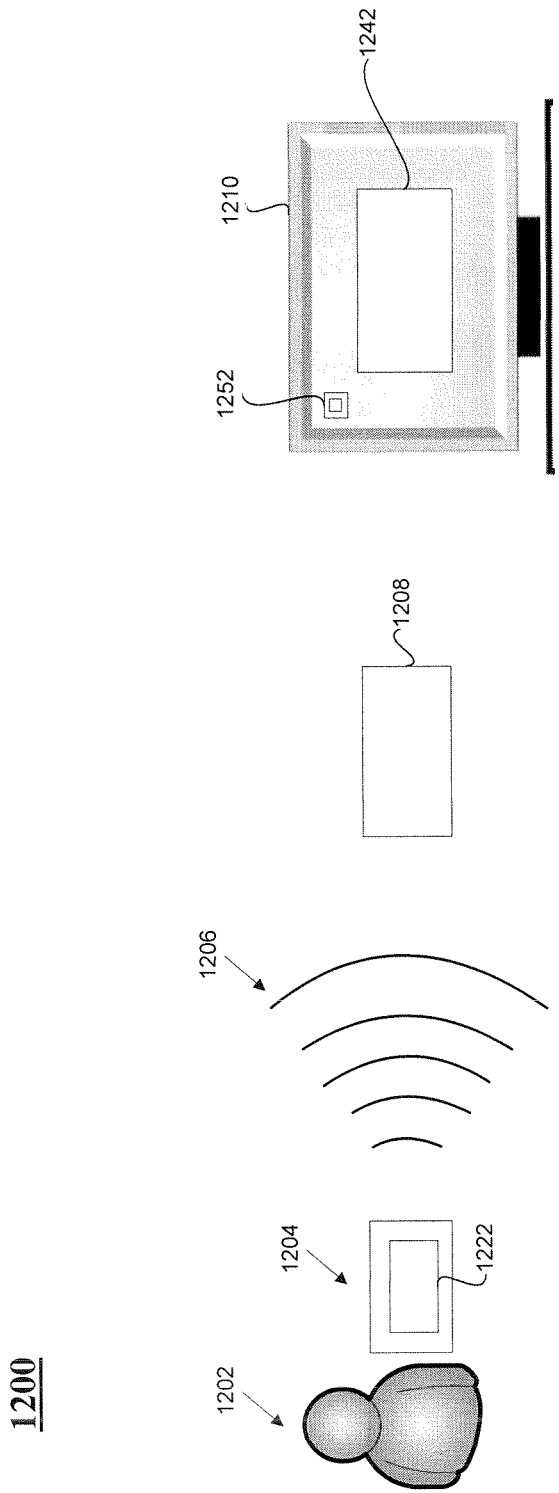
FIG. 12 shows an embodiment of a user with a portable device that can adjust the marker of another display device.

Referring to FIGS. 3A-3E, an embodiment of the present invention is used in a computer game with augmented reality this is discussed in relation to FIG. 12 herein.

Figure 4:
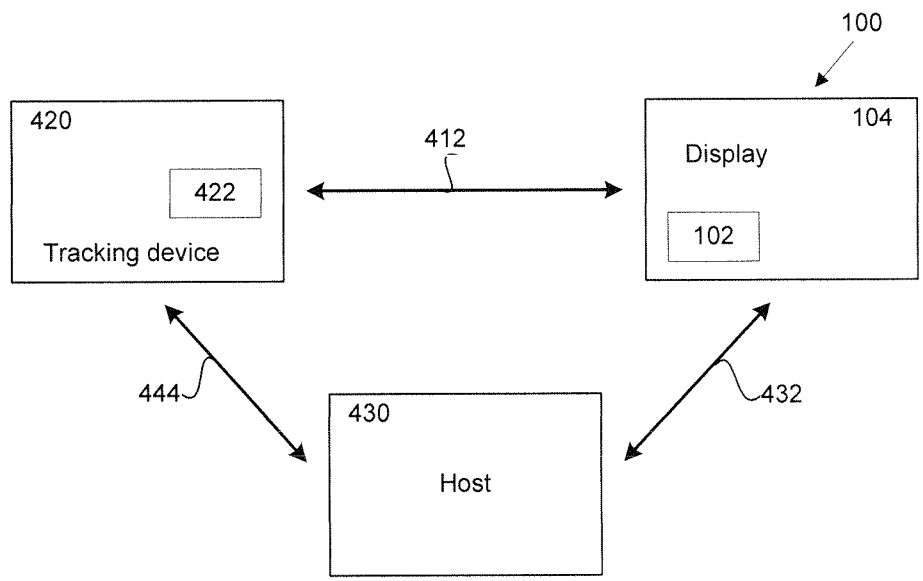
FIG. 4 shows an exemplary tracking system according to an embodiment of the present invention.

FIG. 4 shows an exemplary tracking system 400 according to an embodiment of this invention. The tracking system 400 may track a visible and/or audio marker.

The tracking system 400, as shown in FIG. 4, includes a display 100 with a display screen 104, a tracking device 420, and a host module 430. The display 100 is typically a display device, such as a television, computer screen, plasma screen, LCD, electronic display or other device used to display image data, or a speaker to output audio data. The display 100 may display a TV program, a movie, or a game on screen, or display area 104. The display area 104, when used with a visible marker 102 has content displayed on the display that the marker 102 is distinct from. Alternatively, the display may include a display and a speaker that is adapted to output an audible signal. The ease of identifying the marker 102 is based on the image data, or background of display 104. In the audible marker embodiment it depends on how loud and/or the tone of the audible marker 102.

The tracking device 420 is used to determine how noticeable, or visible, or observable the marker 102 is. The tracking device 420 is adapted to monitor the marker 102. It is also an embodiment of the present invention that the tracking device 420 has adequate storage and processing functionality such that the host device 430 is not needed. Indeed, the system could utilize only the display module 100 and the tracking module 420 without the host device 430.

As stated previously, the marker 102 may be an electronic representation or an audible signal or a combination thereof. For example the marker 102 may be a graphic or pattern or other distinct arrangement of data. In one embodiment of the present invention, the marker 102 may include changing the entire display area 104 a different color. Thus, the marker 102 may be enlarged to cover the entire surface of the display 104.

The host module 430 typically includes a processing module and adds a marker 102 to the display 104, which is displayed to a user during broadcasting of a television program, displaying a video game, showing a movie, advertisement or other content. A tracking device 420 uses a tracking unit or tracking module 422, which may be a camera unit, or microphone or other sensor to detect marker 102 from display 100. Specifically, tracking module 422 may be a camera that photographs the display 104 that is displaying the marker 102. The tracking device 420 further detects the marker 102 on the display 104, determines a confidence level of how the marker may be recognized by a user, and transmits the results to the host module 430. The host module 430 receives the results from the tracking device 420 and determines whether to enhance the confidence level. If the confidence level requires improvement, the host 430 determines whether to change the size, shape, brightness, or contrast or volume or tone of the marker 102 to make the marker more recognizable by the user.

The host 430 may adjust the parameters of the marker and transmit the new parameters to the display 104 so that the display of the marker 102 is adjusted. The process continues until the confidence level indicates that the user may recognize the marker 102 without difficulties. This is determined by ensuring that the marker 102 exceeds parameters relative to the background 104.

The tracking device 420 may be, for example, any apparatus equipped with a camera or receiver or microphone to receive video and/or audible signals related to the marker 102. The tracking apparatus 420 may be portable. For example, the tracking apparatus 420 may be a smart phone, may be a computer, or may be a PSP®.

The host module 430 may be any apparatus equipped with a processor. For example, the host module 430 may be a game console such as PlayStation®, may be a movie player, may be a cable box, may be a TV, or may be a computer. The host module 430 is typically one or more processors with associated memory, such as computers, or other processing devices such as a server, desktop computer, laptop computer and the like. They may be capable of processing and storing data themselves or merely capable of accessing processed and stored data from another location (i.e., both thin and fat terminals).

The communication between the tracking device 420 and the host module 430 or between the display 410 and the host 430 may be implemented via a wireless communication, a cable, a telephone line, Internet, or a broadcast network. These communication channels are shown as 412, 432 and 444 and may be used in conjunction with a network, such as the Internet or any combination of linked computers, or processing devices, adapted to transfer and process data. The network may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

An application of the tracking system may be to improve a user's experience with augmented reality. For example, in an embodiment of the present invention, markers (e.g., makers shown in FIG. 3A-3E) are embedded on an image in a TV display or video game display (104). The augmented reality may be enhanced by using a camera, or a plurality of cameras, to track the visual marker(s). Sometimes these markers are hard to see or notice, possibly because their colors blend in too well with the image on the TV or because the tracker is too far away and the markers become relatively small in size. As shown in FIG. 4, the tracking device 420 in the tracking system 400 communicates, either by obtaining visual indications from the display 100 and/or receiving audio indications from the display 100 as well as with the host 430 that places the markers/audio data on the screen. Based on the relative distinctiveness, or visibility, or observability, the tracking device 420 may request that the host device 430 modify the marker 102. This modification may be to change a component of a marker 102, such as size, color, pattern, darkness, logo, or volume. The tracking device 420 may then evaluate the marker to determine if it more distinct, or if the distinctiveness exceeds a threshold.

Another embodiment of the present invention, as shown in FIG. 4 is that the system 400 may be used to improve a user's experience when watching a TV. For example, network broadcast channels often include a small logo of their channel on the bottom portion of the screen. This logo could be a trackable marker, as shown by element 102 in FIG. 4. When a user cannot recognize the logo, the user may use a smart phone (e.g. tracking device 420) to track the logo (102) and transmit the results to the cable box, which further transmits the results to the cable provider (e.g., host 430), who would adjust the logo accordingly.

Figure 5:
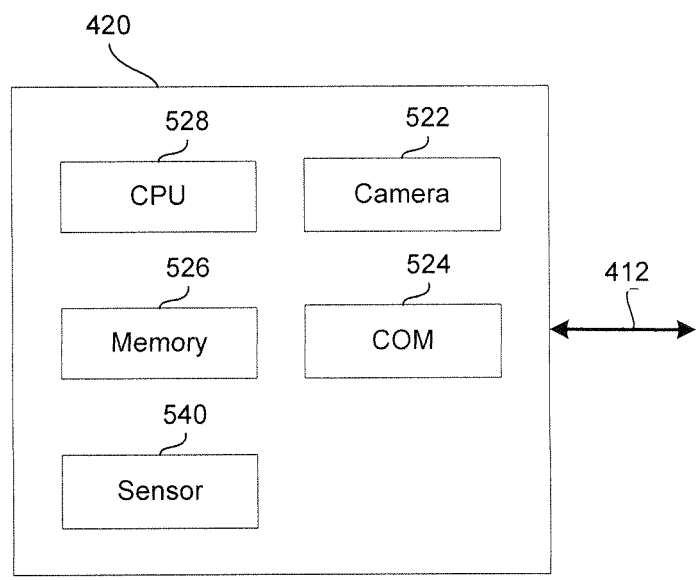
FIG. 5 shows an exemplary tracking device according to an embodiment of the present invention.

FIG. 5 shows an exemplary tracking device 420 according to an embodiment of this invention.

The tracking device 420, which is also shown in FIG. 4, is shown in more detail in FIG. 5. The tracking device 420 includes a camera unit 522, a central processing unit 528, a memory unit 526, a communication unit 524 a sensor unit 540 and bi-directional communication channel, or interconnection mechanism 412.

The camera unit 522 is capable of photographing images with several resolution settings such as 640×320 or 1028×540 and storing the image in the memory unit 526. The camera unit 522 further stores optical parameters of the photographing together with the image. The optical parameters include zoom values and focus distance of the image. These optical parameters allow the tracking device 420 to estimate a proper size of the marker (shown as element 102 herein). The camera 522 may also be used to identify color distinctions and/or scan barcode in an embodiment in which the marker (102) has encoded data, such as when the marker (102) includes a barcode or other encoded data.

The central processing unit 528 includes an ALU and other processing chips or processing modules and is configured to implement at least two steps: an identifying step and a diagnosing step. The identifying step attempts to identify the marker (102) in the image data displayed on the display (104) obtained by camera unit 522 and typically stored in memory module 526. The diagnosing step attempts to determine a confidence level and identify ways to improve the confidence level of the marker if the confidence level is low (i.e., below a predetermined confidence threshold). The confidence level indicates a visibility or audibility of the marker to the user. The confidence level is designed for the vision and brain of a human being rather than for a camera and central processing unit of an apparatus because mechanisms to recognize a marker are difference between a human being and a machine. Furthermore, the confidence level includes multiple values associated with observability, size, shape, brightness, and contrast of the marker.

Memory unit 526 is used to store obtained image data from camera unit 522 as well as algorithms, or program code, or steps that may be executed by CPU 528. For example, memory 526 may store the algorithm shown in FIGS. 7, 8, 9 and 10 herein.

Communications unit 524 is a transmitter/receiver and/or transceiver unit that operates in conjunction with sensor unit 540 to coordinate input, or received data and communicate desired modifications to the host module (430) to execute modification of the marker (102). The communications unit 524 may also coordinate feedback to ensure the modified marker exceeds the desired confidence threshold level.

Sensor unit 540 is used to sense an audible signal from a marker (102). The sensor unit 540 may also be used to sense the marker and/or the display screen in addition to the camera module 522.

Figure 6:
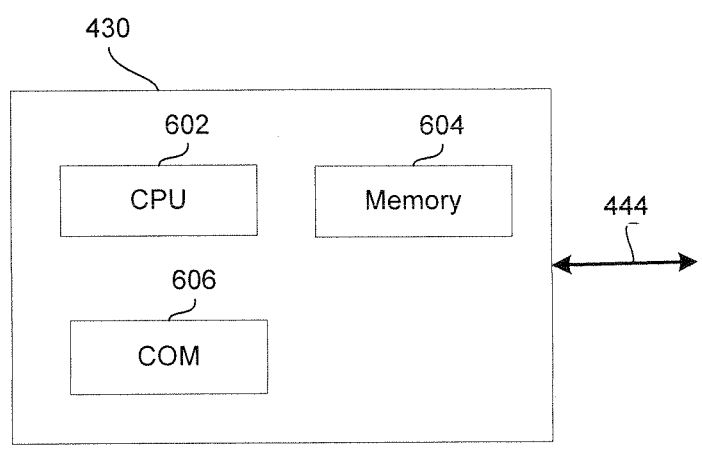
FIG. 6 shows an exemplary host device according to an embodiment of the present invention.

FIG. 6 shows an exemplary host unit, or module, 430 according to an embodiment of this invention.

The host module 430 includes a central processing unit 602, a memory unit 604, and a communication unit 606. The host module 430 is in communication with the other modules via bi-directional communication channel (wired or wireless) 444.

The processing unit 602 is, for example, a processor (CPU) that includes an ALU and other processing chips or processing modules for executing program code or computer commands.

Memory module 604 is typically an electronic storage medium, a series of registers that store data in bit-format, non-transitory computer readable medium or other suitable data structure configured to store data in electronic form. The memory module 604 is adapted to store algorithms, computer code, or instructions, for example the algorithms shown in FIGS. 7, 8, 9, 10, 11 and 13.

The communication unit 606 is a module configured to communicate (transmit/receive) data and information and commands to the tracking unit (420) and the display unit (100), as described herein. For example, the communication unit 606 receives a diagnostic result from the tracking device (420) and can execute program code to identify whether the marker (102) exceeds a predetermined threshold for visibility. If not, the host module components 602, 604 and 606 identify ways to improve the confidence level of observability. This may include adjusting parameters of the marker (102) such as size, color, brightness, contrast, pattern and other features of the marker (102), and transmits the parameters of markers to the display (100).

For example, in one embodiment of the present invention, the host module 430 modifies the marker based on user input. For example, the central processing unit (CPU) 602 receives diagnostic results from the communication unit 606 and determines whether the parameters of the marker (102) need to be adjusted. If the value associated with observability of the confidence level is "F", indicating the user may have difficulty locating or identifying the marker, the central processing unit 602 places a marker on the game once the user changes the location or lighting of the marker. If the value associated with observability is either "E" or "O", which means that the user does not have difficulty recognizing the marker, the central processing unit 602 does not attempt to improve the confidence level and does not adjust the parameters of the marker. If the value associated with observability is "D", the central processing unit 602 obtains values associated with size, brightness, contrast, and shape. The central processing unit 602 determines whether any value equals "L1". If "L1" is identified, the central processing unit 602 enlarges the size of the marker and transmits the parameter to the display (100). If no "L1" is identified, then the central processing unit 602 determines whether "L1", "L2", and "L3" are obtained. If only one of "L1", "L2", "L3" is obtained, then the central processing unit 602 adjusts parameters associated with that value to improve the confidence level of observability. If more than one of "L1", "L2", and "L3" are obtained, the central processing unit 602 randomly selects one and adjusts parameters accordingly. Such trial-and-error improvement continues until the confidence level of observabilitys is either "E" or "O".

Figure 7:
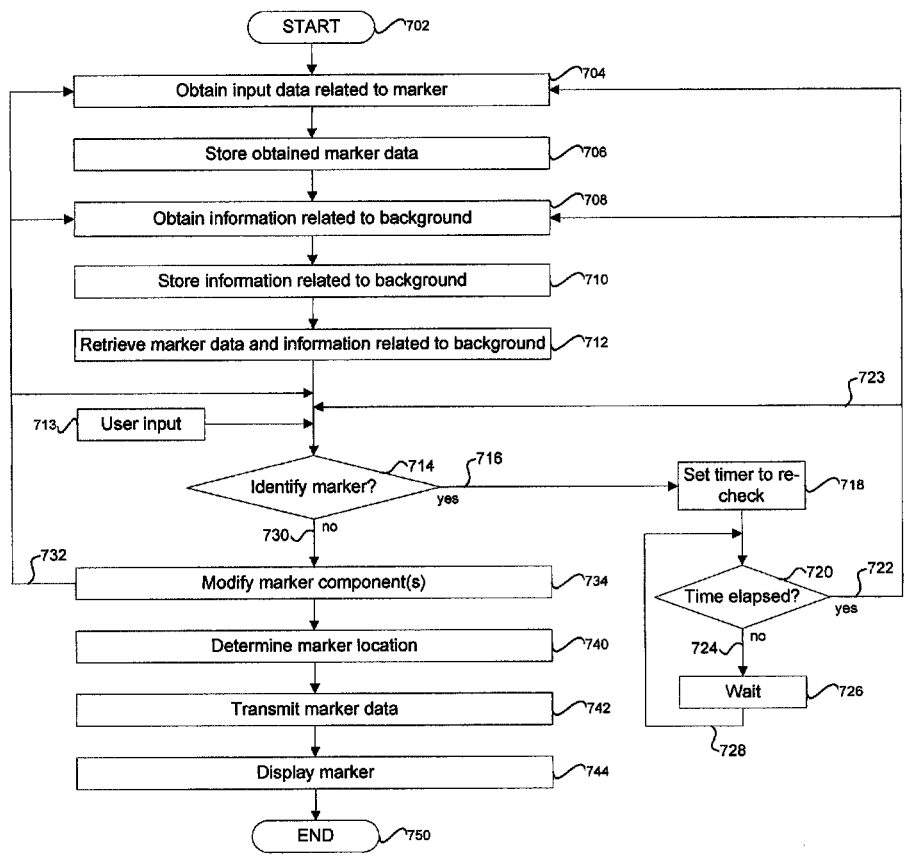
FIG. 7 shows an example of operation of the tracking device according to an embodiment of the present invention.

FIG. 7 shows a process, which is for example, a series of steps, or program code, or algorithm stored on an electronic memory or computer-readable medium. For example, the steps of FIG. 7 may be stored on a computer-readable medium, such as ROM, RAM, EEPROM, CD, DVD, or other non-volatile memory or non-transitory computer-readable medium. The process may also be a module that includes an electronic memory, with program code stored thereon to perform the functionality. This memory is a structural article. As shown in FIG. 7, the series of steps may be represented as a flowchart 700 that may be executed by a processor, processing unit, or otherwise executed to perform the identified functions and may also be stored in one or more memories and/or one or more electronic media and/or computer-readable media, which include non-transitory media as well as signals.

FIG. 7 shows that the series of steps begin in step 702.

Step 704 shows that input data related to a particular marker is obtained. This may be achieved, for example, by a tracking device (420) photographing the screen (100) or other sensing of a location of a marker on a display or screen or image. The obtained marker data may be stored, for example in a memory or other electronic storage medium, as shown in step 706.

Step 708 shows that information regarding the background may be obtained. This background information typically includes colors, patterns and other data and/or images displayed on a display (100). The background information may be obtained by the tracking device (420) and/or the host device (430). Step 710 shows that the background information may be stored. In step 712, the marker data and information related to the background are retrieved.

Step 713 shows that user the user input regarding the marker information may be accessed. This may include, for example, an indication of how easily viewed the marker is. This indication of observability, or visibility, may be qualitative or quantitative or a combination of qualitative and quantitative. (The indication by the user is described in relation to FIG. 6 above.) In step 714, a determination is made whether the marker is identified. This identification determination is made by comparing marker components (i.e., color, size, contrast, brightness, pattern etc) to the current background data of the display device. Alternatively, this determination may be based on user input. Typically a positive or negative response to a query of whether the user can identify the marker.

If the marker can be identified compared to the background, "yes" line 716 shows that a timer is set to re-check the visibility of the marker, as shown in step 718. If the time has not elapsed, as shown in step 720, "no" line 724 shows that a wait cycle is executed, as shown by step 726. Line 728 shows the wait cycle leads back to the determination step 720.

If the time to re-check has elapsed, "yes" line 722 leads back to obtaining input information related to the marker, as shown in step 704. Thus, the series of steps repeats.

Alternatively, line 722 leads to the step of obtaining information related to the background, as shown in step 708. The series of steps then proceeds from that step.

Yet another alternative embodiment shows that line 723 shows that identification of the marker, step 714, may be reached.

Referring back to identifying the marker, as shown in step 714, "no" line 730 shows that a step of modifying the marker, step 734 is reached. This modification typically includes modifying one or more components of the marker such as color, size, pattern, contrast, darkness, volume level or other characteristic of the marker.

Line 732 leads back to obtaining input information related to the marker, as shown in step 704. Thus, the series of steps repeats.

Alternatively, line 732 leads to the step of obtaining information related to the background, as shown in step 708. The series of steps then proceeds from that step.

Yet another alternative embodiments shows that line 732 shows that identification of the maker, step 714 may be reached.

Step 740 shows that a determination is made that the marker is visible. Step 742 shows that this determination may be sent to the host (430). The marker is displayed, as shown in step 744.

End step 750 shows the steps end.

Figure 8:
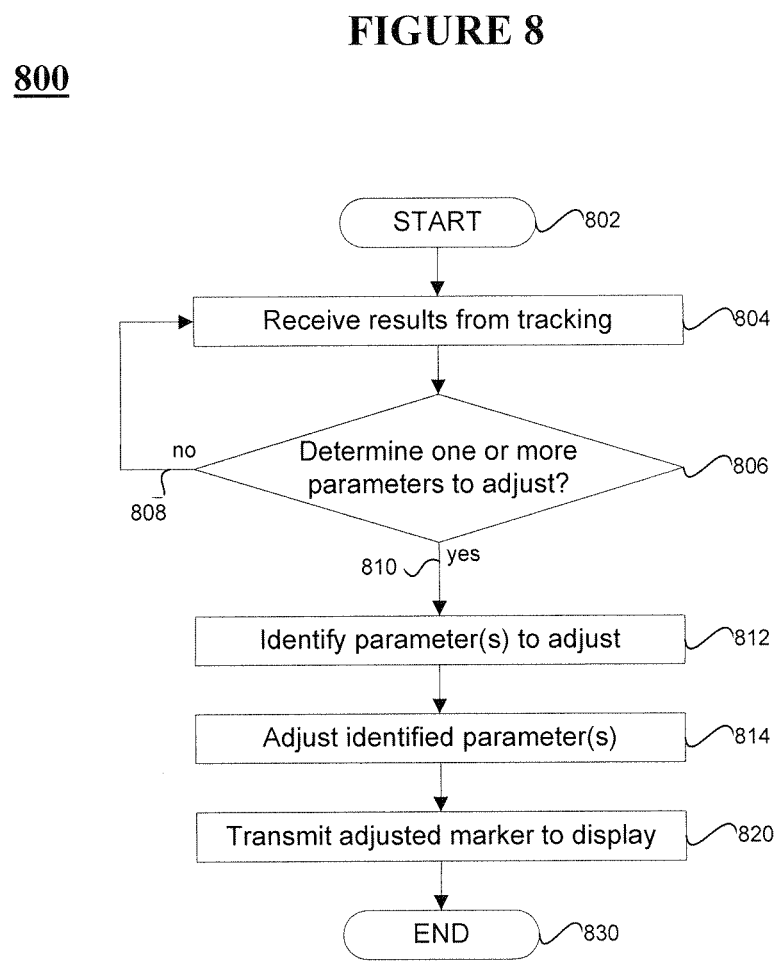
FIG. 8 shows an exemplary operation of the host device according to an embodiment of the present invention.

FIG. 8 shows an exemplary operation 800 of the host module (e.g. host module as shown as element 430 herein). FIG. 8 shows a process, which is for example, a series of steps, or program code, or algorithm stored on an electronic memory or computer-readable medium. For example, the steps of FIG. 8 may be stored on a computer-readable medium, such as ROM, RAM, EEPROM, CD, DVD, or other non-volatile memory or non-transitory computer-readable medium. The process may also be a module that includes an electronic memory, with program code stored thereon to perform the functionality. This memory is a structural article. As shown in FIG. 8, the series of steps may be represented as a flowchart 800 that may be executed by a processor, processing unit, or otherwise executed to perform the identified functions and may also be stored in one or more memories and/or one or more electronic media and/or computer-readable media, which include non-transitory media as well as signals.

The steps begin with step 802. At step 804, the host module (430) receives the results from the tracking device (420). At step 806, the host determines which parameter(s) to adjust according to the received results.

If no adjustment is to be made, "no" line 808 leads to step 804.

If an adjustment is appropriate, "yes" line 810 leads to an identification of parameter(s) to adjust, as shown in step 812 and then one or more parameters that were identified are adjusted, as shown in step 814. This step adjusts one or more parameters of the marker.

Step 820 shows that the host module (430) transmits the adjusted parameters to the display module (100). Step 830 is an end step.

Figure 9:
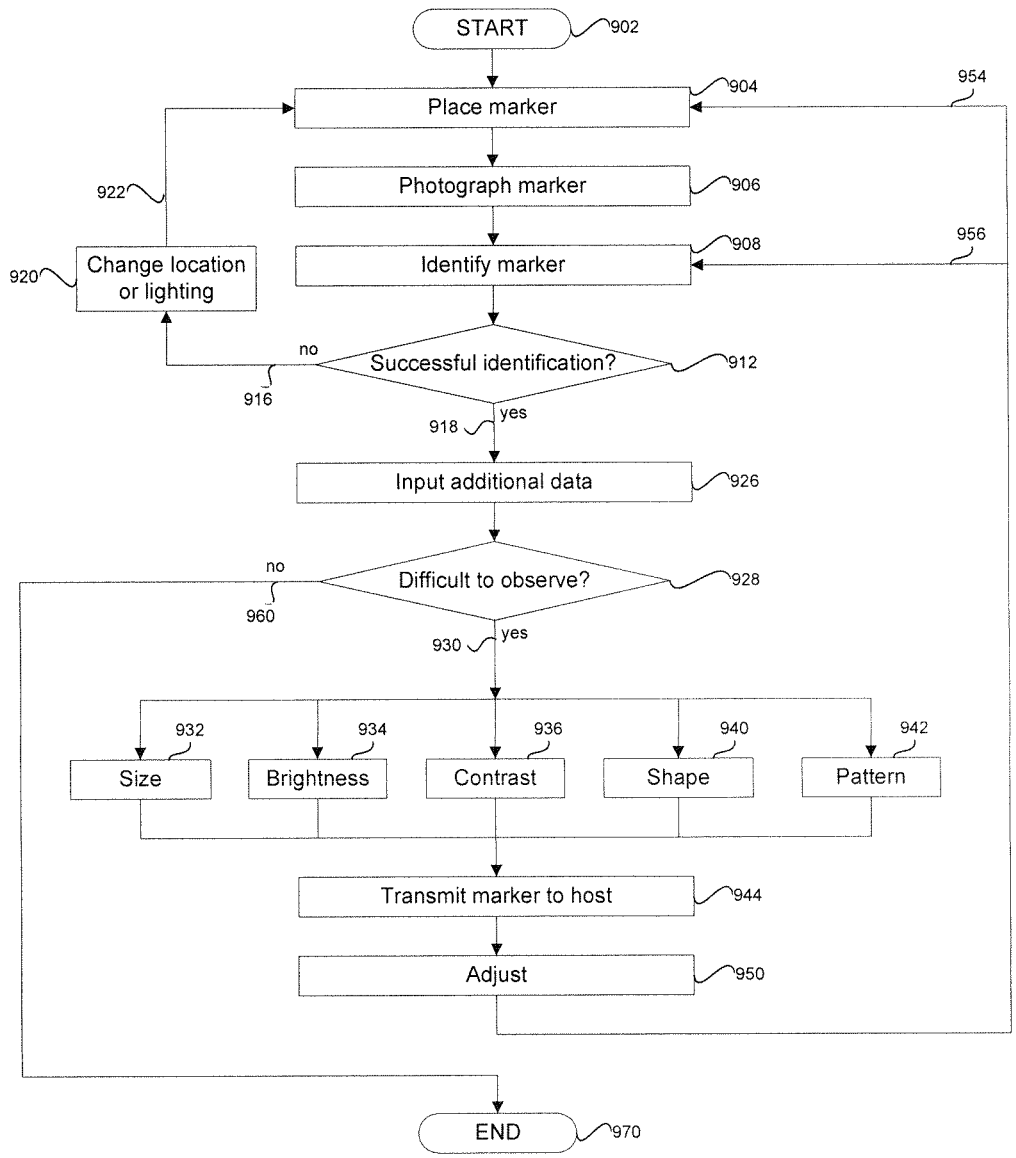
FIG. 9 shows an exemplary operation of the tracking system according to an embodiment of the present invention.

FIG. 9 shows an exemplary operation of the tracking system (400). FIG. 9 shows a process, which is for example, a series of steps, or program code, or algorithm stored on an electronic memory or computer-readable medium. For example, the steps of FIG. 9 may be stored on a computer-readable medium, such as ROM, RAM, EEPROM, CD, DVD, or other non-volatile memory or non-transitory computer-readable medium. The process may also be a module that includes an electronic memory, with program code stored thereon to perform the functionality. This memory is a structural article. As shown in FIG. 9, the series of steps may be represented as a flowchart 900 that may be executed by a processor, processing unit, or otherwise executed to perform the identified functions and may also be stored in one or more memories and/or one or more electronic media and/or computer-readable media, which include non-transitory media as well as signals.

The series of steps begins at step 902. At step 904, the host module (FIG. 4, element 430) places a marker (FIG. 1, element 102) on a screen (FIG. 1, element 104). At step 906, a sensing device or module, such as the tracking device (FIG. 4, element 420) photographs the screen (100) and the marker (102). At step 908, the tracking device (430) attempts to identify the marker. This may also be based on user input such as a user providing an indication (qualitative and/or quantitative) of how visible the marker is. At step 912, it is determined whether the marker is successfully identified. If the marker is not successfully identified, "no" line 916 shows that step 920 asks the user to change a location or lighting of the marker. Line 922 shows that the marker that has been placed in a different location or has a different lighting condition is replaced on the screen at step 904.

If the marker is successfully identified in step 912, "yes" line 918 shows that the tracking device asks the user to input a value indicating how easily the marker is recognized by the user, as shown in step 926. This input may be a number representing a scaled value, such as a "2" on a scale of "1 to 5", "5" being very clear and "1" being not visible. The input may also be a comment, such as "fuzzy" or "color blends with background". Alternatively, the input may be a combination of a numerical rating and a comment. For example, a 2 color, meaning the marker is a level 2 between 1 and 5 and the reason is because the color is not distinct. Another example is a 1 size. This means the marker is very difficult to see because the size is too small. Thus the input may be quantitative and/or qualitative.

At step 928, a determination is made whether the value indicates that the user has difficulties viewing the marker. If the user has no difficulties viewing the marker, "no" line 960 shows that the process ends at end step 970.

If it is determined that the user has difficulties in viewing the marker, in step 928, "yes" line 930 shows that the tracking device (420) determines values of confidence levels associated with size (932), brightness (934), contrast (936), shape (940) and pattern (942) of the marker. (These are derived from the input data, or rating, such as "1 size", described above. These values are transmitted to the host module (430), as shown in step 944. At step 950, the host identifies ways to improve the confidence level and adjusts parameters accordingly. As shown by line 954, the marker with new parameters is replaced on the screen at step 904. Thus, the operation of the tracking system, as described herein facilitates representation of a recognizable marker on the screen.

Figure 10:
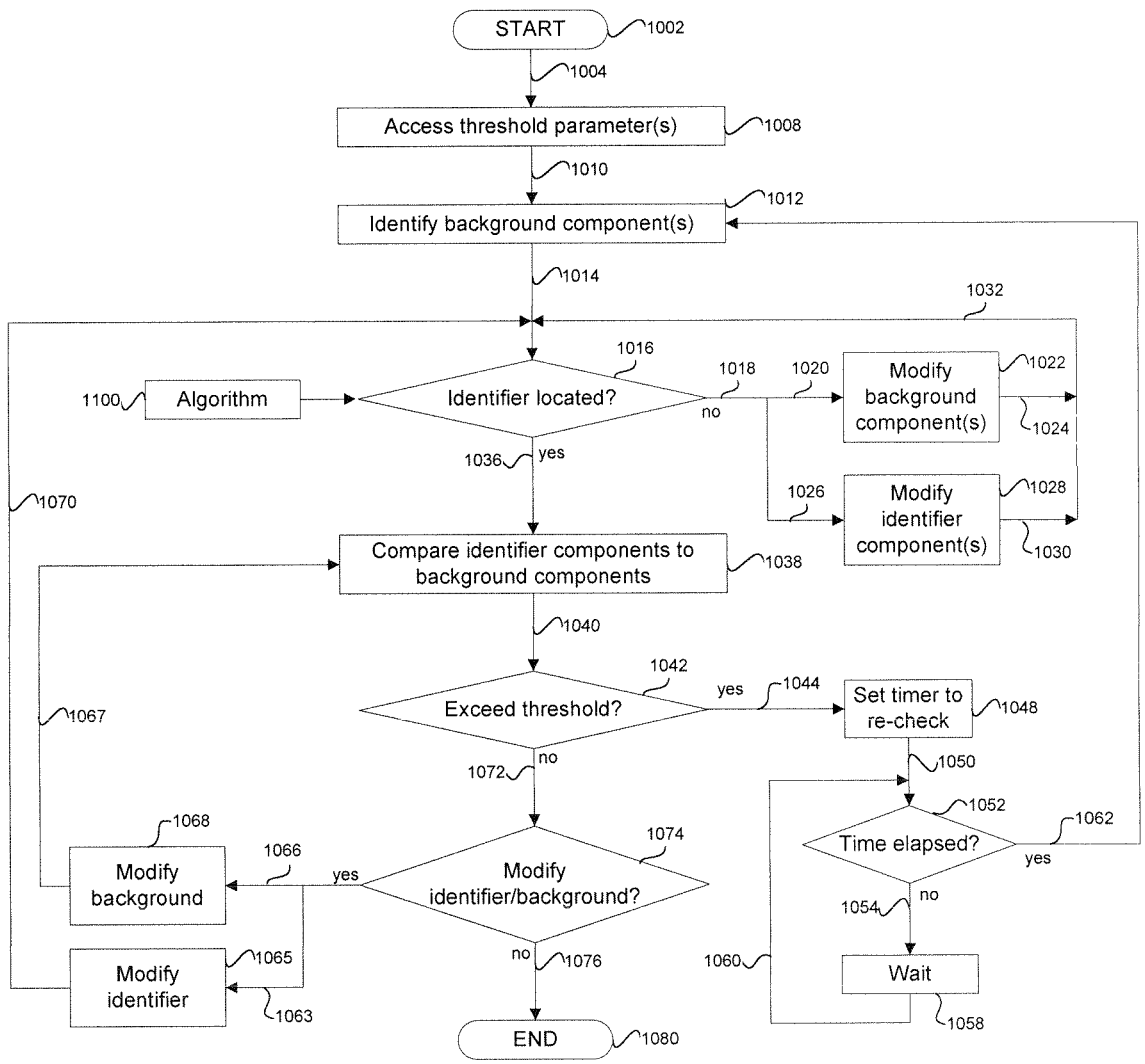
FIG. 10 shows an example of steps used to implement an embodiment of the present invention.

FIG. 10 shows an exemplary operation of the tracking system. FIG. 10 shows a process, which is for example, a series of steps, or program code, or algorithm 1000 stored on an electronic memory or computer-readable medium. For example, the steps of FIG. 10 may be stored on a computer-readable medium, such as ROM, RAM, EEPROM, CD, DVD, or other non-volatile memory or non-transitory computer-readable medium. The process 1000 may also be a module that includes an electronic memory, with program code stored thereon to perform the functionality. This memory is a structural article. As shown in FIG. 10, the series of steps may be represented as a flowchart 1000 that may be executed by a processor, processing unit, or otherwise executed to perform the identified functions and may also be stored in one or more memories and/or one or more electronic media and/or computer-readable media, which include non-transitory media as well as signals. The process begins with start step 1002. Line 1004 shows that one or more threshold parameter(s) are accessed, as shown in step 1008. This parameter may be accessed from an electronic storage medium, or external location, or other register adapted to store such information. Line 1010 shows that background components are identified, as shown in step 1012. These background components include color, pattern and contrast of the background. This background information may be obtained by obtaining screen display information from a camera or other imaging device that is adapted to capture the images, or text or graphics displayed on a display unit.

Line 1014 shows that a determination of whether the identifier, or marker is located is made, as shown in step 1016. This determination may be made based on, or as a function of the algorithm 1100, which is described in more detail in FIG. 11.

If a determination is made that the identifier, or marker, is not visible, "no" line 1018 shows that the background components (contrast, color, pattern or any combination thereof) may be modified, as shown by line portion 1020 leading to step 1022. Also, or in addition, the identifier, or marker components may be modified, as shown by line portion 1026 leading to step 1028. Lines 1024 and 1030 join to form line 1032, which leads back to determination step 1016. This is typically an initiation procedure to confirm that a marker/identifier is present. Once the marker has been identified, the monitoring portion is implemented.

For example, when the identifier, or marker, is located, "yes" line 1036 shows that a comparison is made between the marker components and the background components, as shown in step 1038. These have been discussed previously herein and include color, size, pattern, contrast, darkness and other characteristics. These parameters may be retrieved from memory and/or accessed from user input. Line 1040 leads to a determination of whether the distinction between the background and marker exceeds a threshold, as shown in step 1042.

If the marker is sufficiently distinct from the background, "yes" line 1044 shows that a timer is set to re-check, as shown in step 1048. Line 1050 shows that a determination of elapsed time is made in step 1052. If the time has not elapsed, "no" line 1054 leads to waiting step 1058 and line 1060 leads back to step 1052. If the time has elapsed, "yes" line 1062 shows that identification of background components, as shown in step 1012 is reached.

If the visibility threshold is not reached, as shown in step 1042, "no" line 1072 shows that a determination is made whether to modify the identifier and/or modify the background, as shown in step 1074. If a modification is necessary or desired, line 1066 shows that the background components may be modified, as shown in step 1068. Line 1067 shows that comparison step 1038 is reached. Also, line 1063 shows that the identifier may be modified, as shown in step 1065. Line 1070 shows location determination step 1016 is then reached. As shown in FIG. 10, the background and/or identifier may be modified and the new parameters of background and/or identifier may be checked for visibility.

If the identifier/background is not modified, in step 1074, "no line 1076 shows end step 1080 is reached.

Figure 11:
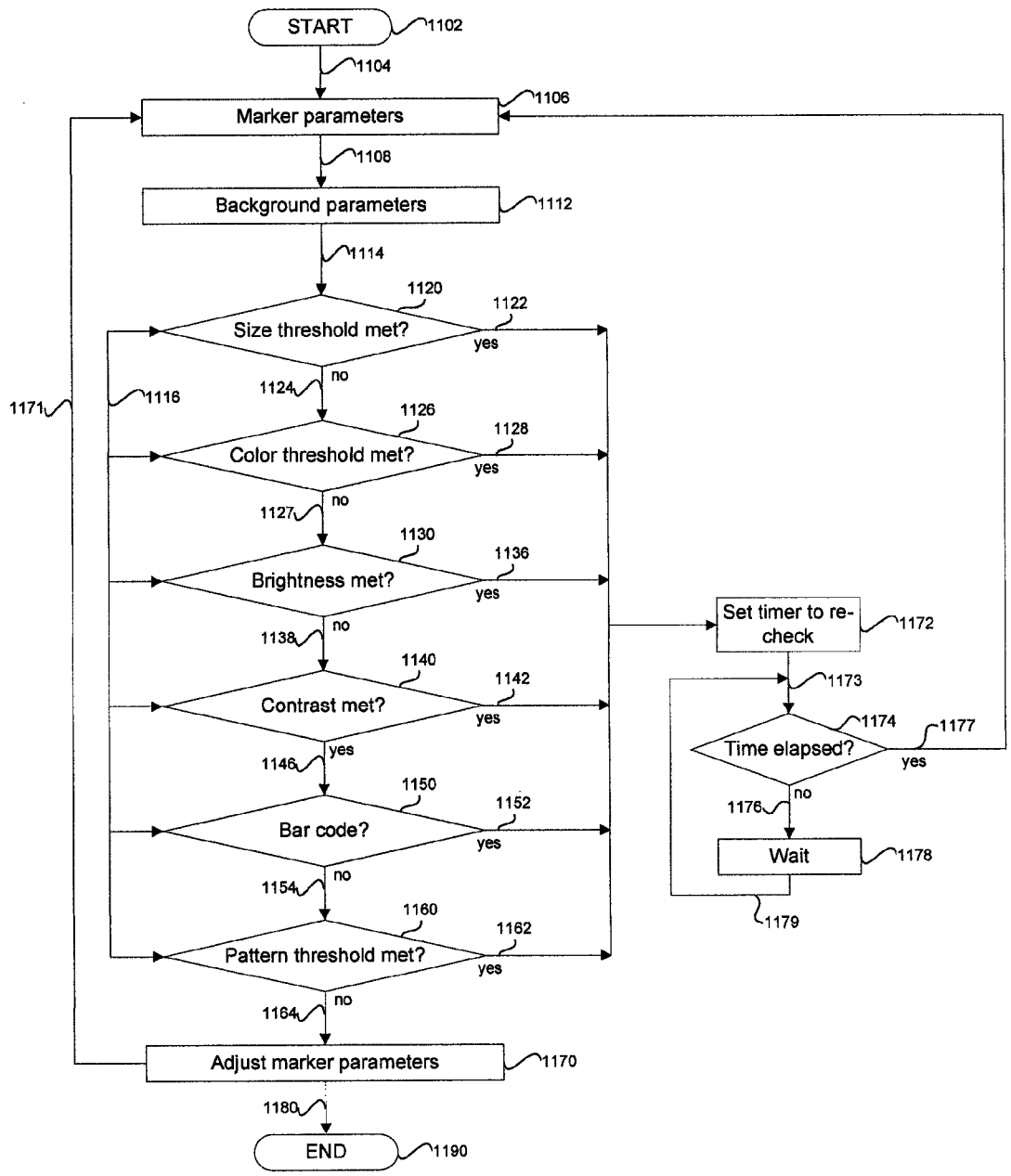
FIG. 11 shows another example of a series of steps to implement an embodiment of the present invention.

FIG. 11 shows an example of an algorithm 1100 to determine whether a marker is adequately visible relative to a background. FIG. 11 shows a process, which is for example, a series of steps, or program code, or algorithm 1100 stored on an electronic memory or computer-readable medium. For example, the steps of FIG. 11 may be stored on a computer-readable medium, such as ROM, RAM, EEPROM, CD, DVD, or other non-volatile memory or non-transitory computer-readable medium. The process 1100 may also be a module that includes an electronic memory, with program code stored thereon to perform the functionality. This memory is a structural article. As shown in FIG. 11, the series of steps may be represented as a flowchart 1100 that may be executed by a processor, processing unit, or otherwise executed to perform the identified functions and may also be stored in one or more memories and/or one or more electronic media and/or computer-readable media, which include non-transitory media as well as signals. The process begins with start step 1102. Line 1104 shows that marker parameters are accessed, as shown in step 1106. These marker parameters, or marker components, include, for example, a size, color, brightness, contrast, barcode, pattern, or any combination thereof as well as an audible signal, such as a chirp or beep or ring or other tone.

The marker parameters may be stored in a memory, received from a remote location, transmitted as signal data, or accessed by any other suitable mechanism. Line 1108 shows that in step 1112 background parameters are accessed. These background parameters include, for example, color, brightness, and pattern and represent the background of a display device, as described herein. As should be apparent, the sequence and inclusion of steps shown in FIG. 11 may be optional. The steps described in FIG. 11 may be used in combination with other steps.

Line 1114 shows that in step 1120 a determination is made whether the size of the marker exceeds a pre-determined threshold. This threshold is accessed as described in relation to step 1106. If the size component, or parameter, does exceed the threshold, "yes" line 1122 shows that timer step 1172 is reached. This means that the size of the marker is adequate to cause the marker to be visible to a user. If the size parameter is not adequate, "no" line 1124 leads to step 1126, which shows the color of the marker is determined.

In step 1126 a determination is made whether the color of the marker exceeds a pre-determined threshold. This threshold is accessed as described in relation to step 1106. If the color component, or parameter, does exceed the threshold, "yes" line 1128 shows that timer step 1172 is reached. This means that the color of the marker is adequate to cause the marker to be visible to a user. If the color parameter is not adequate, "no" line 1127 leads to step 1130, which shows the brightness of the marker is determined.

In step 1130 a determination is made whether the brightness of the marker exceeds a pre-determined threshold. This threshold is accessed as described in relation to step 1106. If the brightness component, or parameter, does exceed the threshold, "yes" line 1136 shows that timer step 1172 is reached. This means that the brightness of the marker is adequate to cause the marker to be visible to a user. If the brightness parameter is not adequate, "no" line 1138 leads to step 1140, which shows the contrast of the marker is determined.

In step 1140 a determination is made whether the contrast of the marker exceeds a pre-determined threshold. This threshold is accessed as described in relation to step 1106. If the contrast component, or parameter, does exceed the threshold, "yes" line 1142 shows that timer step 1172 is reached. This means that the contrast of the marker is adequate to cause the marker to be visible to a user. If the contrast parameter is not adequate, "no" line 1146 leads to step 1150, which shows the barcode scanning of the marker is determined.

In step 1150 a determination is made whether the bar code is capable of being scanned. This is embodiment is used when the marker includes a bar code. This threshold is accessed as described in relation to step 1106. If the bar code component, or parameter, does exceed the threshold, "yes" line 1152 shows that timer step 1172 is reached. This means that the bar code of the marker is adequate to be scanned by a scan. If the bar code parameter is not adequate, "no" line 1154 leads to step 1160, which shows the pattern of the marker is determined.

In step 1160 a determination is made whether the pattern of the marker is capable of being recognized. This threshold is accessed as described in relation to step 1106. If the pattern component, or parameter, does exceed the threshold, "yes" line 1162 shows that timer step 1172 is reached. This means that the pattern of the marker is adequate to be recognized by a user. If the pattern parameter is not adequate, "no" line 1164 leads to step 1170, which shows the marker is adjusted.

Step 1170 shows that one or more of the marker parameters may be adjusted. Thus, in the event that any parameter should be modified, the parameter(s) are adjusted, as shown in step 1170. Line 1171 shows that step 1106 is reached. Thus, the process of checking various parameters is repeated. In the second iteration, the adjusted marker parameters are evaluated.

Step 1172 shows that a timer is set to re-check the visibility of the marker. Line 1173 shows that decision step 1174 is reached, which determines whether the time has elapsed. If the time has not elapsed, as shown in step 1174, "no" line 1176 shows that a wait cycle is executed, as shown by step 1178. Line 1179 shows the wait cycle leads back to the determination step 1174.

If the time to re-check has elapsed, "yes" line 1177 leads back to marker parameter step 1106.

Line 1180, from step 1170 shows that end step 1190 is reached.

FIG. 12 shows a game embodiment 1200. A user, or person, 1202 is shown using a portable device 1204, such as a PDA, laptop, PSP™ PS3™ or other display device to attempt to track a marker 1252 on a display 1210 such as a television, display screen or other display device or display module. The marker 1252 being placed on the screen 1210 by a console, or host device 1208. As shown in FIG. 12, the portable device 1204 may also display content 1222 and is adapted to receive and send signals 1206 to the host device 1208. The display screen 1210 is also suitably adapted to display data 1242 as well as marker 1252. The host device 1208 is adapted to control the marker 1252 that is displayed on display screen 1210. The host device 1208 is in wired or wireless communication (not shown) with display screen 1210 as well as device 1204. As shown in FIG. 12, the marker 1252 may not be visible to the user 1202 due to a marker component (e.g., size shape, color pattern, contrast). The user can use portable device 1204 to send a command to host 1208 to adjust one or more of the marker components to make the marker 1252 more visible to the user 1202. For example, if the user 1202 is not able to view the marker 1252, because the color is very similar to the color of content 1242 being displayed on the display module 1210, the user 1202 using the portable device 1204 notifies the gaming console 1208 that the colors are unsatisfactory. The host 1208 changes the color of the marker 1252 such that the user 1202 is able to see the marker 1252 more easily. The user can continually send messages to the host 1208 so the host continues to change the color of marker 1252 until the user 1202 can more easily view the marker 1252.

Another example of marker modification is that a person 1202 is standing significantly far away from a display device 1210, such as a television. The user 1202 using a portable device 1204 may try and track the marker 1252; but since the user 1202 is so far away, the size of marker 1252 causes the user 1202 to be unable to easily see the marker 1252. Thus, the user, 1202, using portable device 1204 sends a signal to the host device 1208 that the size of the marker 1252 needs to be increased. The host module 1208 responds by increasing the size of the marker 1252 that is displayed on display 1210.

Furthermore, in a game embodiment, a marker 1252 is placed in an environment surrounding a user 1202 and an image of the marker and the environment is taken to be used as a background of the game 1242. A game console 1208, knowing the design of the marker 1252, detects the marker in the image 1242 and displays game objects on top of the marker for the user to play with. In order for the user 1202 to enjoy a virtual reality, a marker 1252 is recognizable from both the environment and the game objects.

Figure 13:
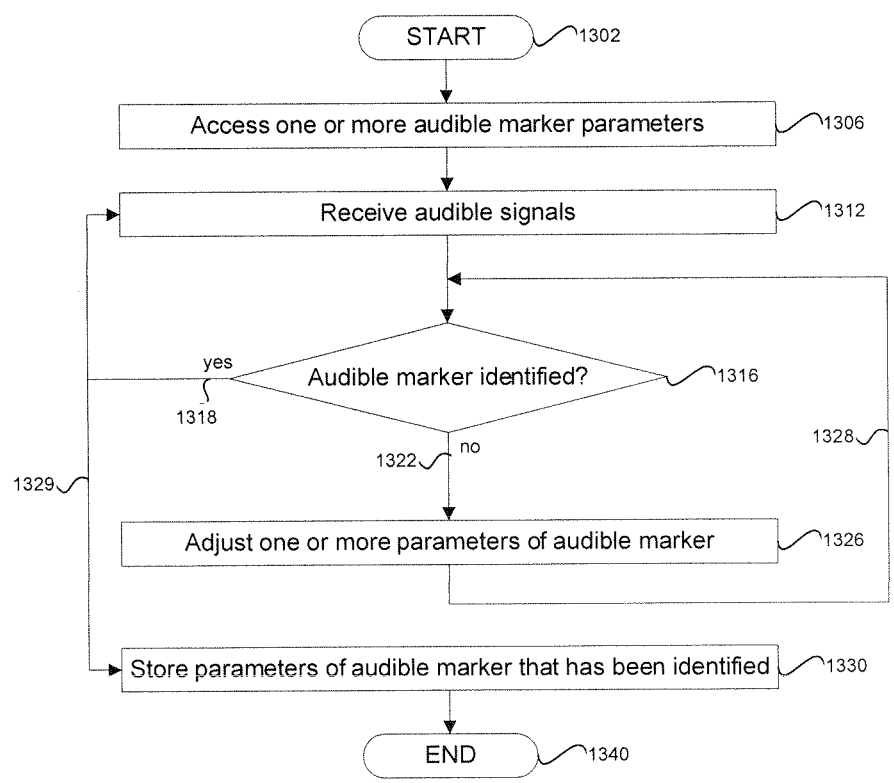
FIG. 13 shows an embodiment of the present invention in which the marker is audible indicator.

FIG. 13 shows an example of an algorithm 1300 to determine whether a marker is adequately audible relative to a background. FIG. 13 shows a process, which is for example, a series of steps, or program code, or algorithm 1300 stored on an electronic memory or computer-readable medium. For example, the steps of FIG. 13 may be stored on a computer-readable medium, such as ROM, RAM, EEPROM, CD, DVD, or other non-volatile memory or non-transitory computer-readable medium. The process 1300 may also be a module that includes an electronic memory, with program code stored thereon to perform the functionality. This memory is a structural article. As shown in FIG. 13, the series of steps may be represented as a flowchart 1300 that may be executed by a processor, processing unit, or otherwise executed to perform the identified functions and may also be stored in one or more memories and/or one or more electronic media and/or computer-readable media, which include non-transitory media as well as signals. The process begins with start step 1302.

Audible marker parameters are accessed, as shown in step 1306. These include for example, pitch, tone, volume, frequency and other audible characteristics that may be used for an audible marker. The audible parameter may also be difficult to identify due to background noise or other sounds being emitted, such as game sound effects and other audible signals. Step 1312 shows that audible signals are attempted to be received at a user device, as shown in step 1316. If the audible signal can not be detected, "no" line 1322 shows that a host device can increase one or more parameters of the audible signal, as shown in step 1326. Line 1328 shows that one or more parameters of the audible marker may be adjusted until the marker is identified, as shown in step 1316 and "yes" line 1318 leads to step 1312 that receives audible signals.

The line 1329 shows that the parameters of an audible marker are stored, as shown in step 1330. End step 1340 shows the process ends.

In the above discussion, the confidence level associated with observability is determined by a selection of the user 1202. However, the confidence level may be determined automatically. The central processing unit may obtain the optical characteristics of the identified marker 1252 and then determine a confidence level associated with observability based on color, contrast, and brightness. More specifically, the central processing unit may determine the confidence level to "Easy" when the optical characteristics associated with color, contrast, and brightness are all greater than a predetermined value. The central processing unit determines the confidence level to be "Difficult" when the optical characteristics associated with color, contrast, brightness are all lower than a predetermined value. Alternatively, the confidence level associated with observability may be determined according to a learning process. Each time, the user 1202 inputs a value associated with the confidence level, the central processing unit stores the optical characteristics and the value to the memory. Therefore, overtime, the memory has a plurality of optical characteristics and confidence values. When a new marker is identified by the central processing unit, the central processing unit compares the optical characteristics of the newly identified marker with previous observabilities and determines a confidence level based on the comparison. The previously results may be statistically processed so that each confidence level is associated with a range of values associated with an optical parameter, such as a brightness. If the newly identified marker has an optical parameter within the range, then the confidence level is determined.

In the above discussions, visual markers are typically used as an example. However, it is noted that the tracking system (described as element 430 herein) is not limited to systems that use visual markers. It could be extended to any system that has trackable markers that can be adjusted dynamically. For example, if the system uses a marker in an acoustic form, such as audio chirps for tracking, the tracking device includes a microphone unit to records the marker. The tracking device further detects the marker and determines a confidence level indicating an audibility of the marker to a user. The tracking device further transmits to the host the confidence level. The host may adjust the pitch of the chirp, or the frequency of the chirp based on the transmitted results.

An embodiment of the present invention will now be described that is used to implement a method for tracking either an audio or visual marker or a visual marker with an audio component.

During the identifying step, the tracking device asks the user which marker is used. To input the marker information, the user may input the identification of the marker. The tracking device may present markers stored in the memory unit for the user to select. Once the marker information is obtain, the central processing unit implements algorithm to identify the marker in the image according to the marker information. The identifying step also identifies objects in the adjacent areas close to the marker. Algorithm for identifying an object with a known shape in an image and objects in vicinity areas is known to a person of ordinary skill in the art and is not explained herein in detail. U.S. Pat. No. 5,640,468 to Hsu describes a method for identifying objects and features in an image, the entirety of which is incorporated herein by reference. The identifying step may detect the marker successfully or may not detect the marker at all. The identifying step stores the results in the memory unit.

After the identifying step, the central processing unit implements a diagnosing step. If the identifying step fails to identify the marker, the central processing unit set a value of a confidence level associated with the observability to be "F", which means that the marker is not recognizable at all. When the marker is not successfully identified, the central processing unit transmits the result to the host without any further processing in the diagnosing step. The central processing unit then asks the user to change a location of the physical marker or a lighting situation. If the identifying step successfully identifies the marker, the central processing unit asks the user about how easy the user recognizes the marker. The central processing unit may ask the user to select a value from "Easy", "OK", and "Difficult" and assign a value of a confidence level associated with the observability to "E", "O", and "D" respectively. If the user's input is "Easy" or "OK", no further process in the diagnosing step is implemented. If the user's input is "Difficult", the central processing unit determines values of the confidence level associated with size, shape, brightness, and contrast. The central processing unit determines a minimum size of the marker in the image according to the optical parameters and the resolution of the image. If the size of the indentified marker is smaller than the minimum size, then a value of a confidence level associated with the size of marker is set to "L1", which means that the marker is difficult to be recognized due to a small size. The central processing unit determines whether the difference between the brightness of the identified marker and the vicinity area is greater than a predetermined value associated with human vision. If the difference is not greater, the central processing unit assigns a value of a confidence level associated brightness of marker to "L2", which means that the marker is difficult to be recognized due to a low brightness. The central processing unit further determines whether the contrast of the identified marker is greater than the predetermined value, if the contrast is not greater, then a value of a confidence level associated with contrast of the marker is set to "L3", which means that the marker is difficult to identify due to the contrast. The central processing unit further determines whether the shape of the marker is similar with shapes of other objects in the vicinity of the identified marker, if it is similar, a value of a confidence level associated with shape of the marker is set to "L4", which means that the marker is difficult to identify due to the shape. The results of the identifying step and the diagnosing step are transmitted to the host in a packet that includes the values of confidence levels associated with observability, size, brightness, contrast, and shape.

Figure 14:
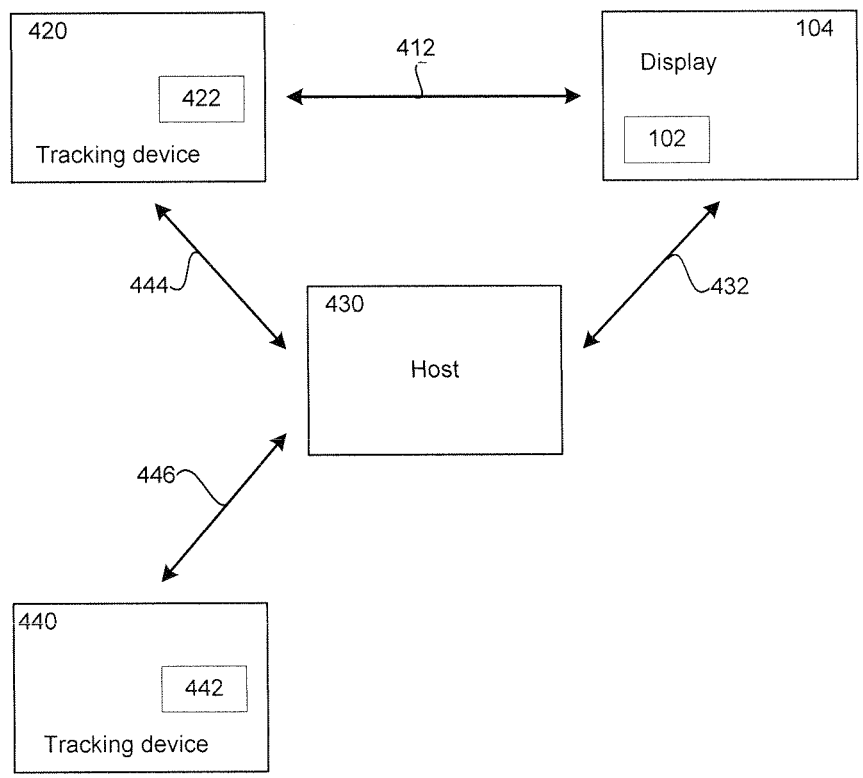
FIG. 14 shows an embodiment of the present invention in which more than one tracking device is utilized.

FIG. 14 shows an embodiment of this invention when more than one tracking device is utilized.

The system 1400, as illustrated in FIG. 14, includes all the components of the system 400 illustrated in FIG. 4. The components included in FIG. 14 and FIG. 4 are labeled with the same numerical references. Compared to the system 400, the system 1400 includes more than one tracking device such as two, three, or more tracking devices 440. For the sake of clarity, only two tracking devices 420 and 440 are illustrated in FIG. 14. The tracking devices 420 and 440 may be same apparatus such as two gaming devices or two smartphones. The tracking devices 420 and 440 may also be different apparatus such as a smartphone/a gaming device. Among all the tracking devices, a parent/child relationship may be set so that one tracking device acts as a parent. If a parent/child relationship is not set, all the tracking devices are treated equally. The host module 430 receives input including images and tracking results from all tracking devices and analyzes the input to determine an improvement of the visibility of a marker displayed on the display device 104.

Figure 15:
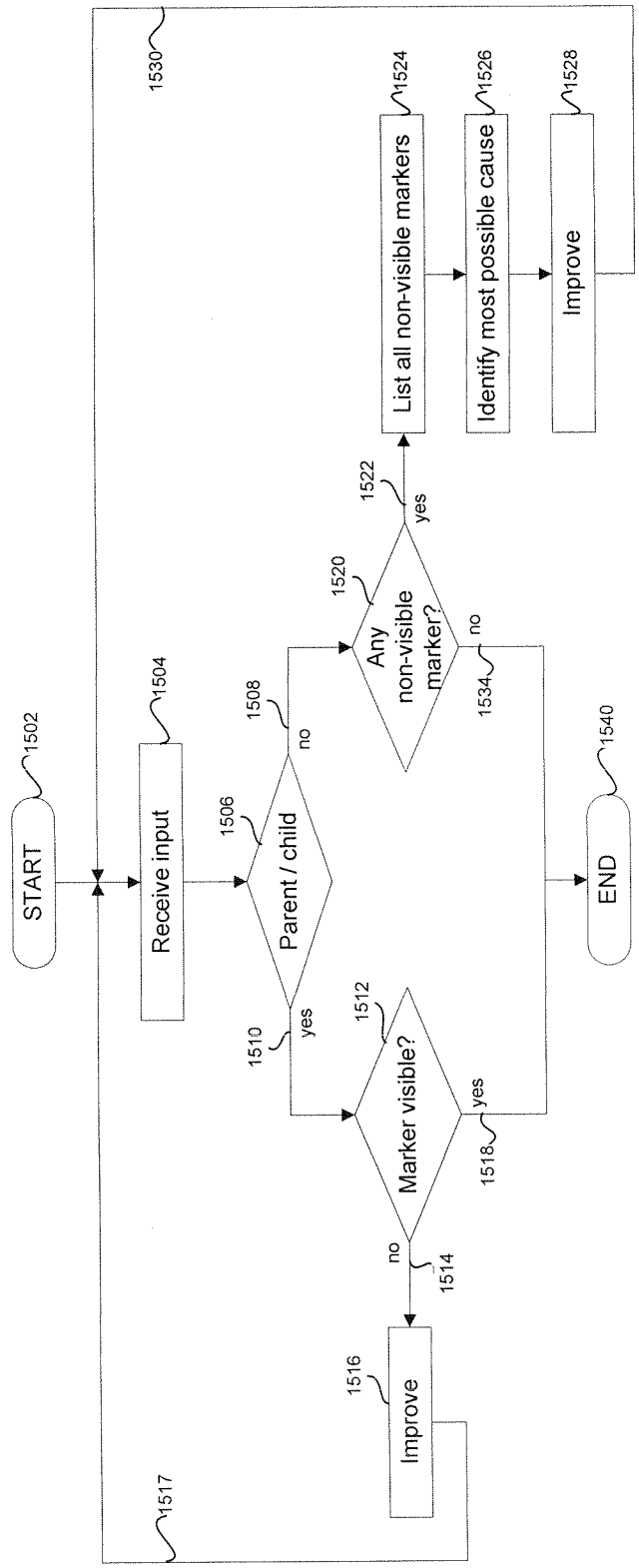
FIG. 15 shows an example of steps when more than one tracking device is utilized.

FIG. 15 shows the steps of a marker tracking and improving process implemented by the system 1400.

At the start step 1502, the display device (104 in FIG. 4) displays a marker (102 in FIG. 4), and every tracking device implements a tracking process that tracks the marker (102) and reports the tracking result to the host module (430). At step 1504, the host module (430) receives and stores tracking results from every tracking device. The tracking result transmitted from each tracking device includes an ID of the tracking device, image data, a confidence level, and tracking results associated with shape, size, color, and pattern of the marker (102). At step 1506, the host module (430) determines whether, among the tracking devices, whether a parent/child relationship is set. If a parent/child relationship is set, the host module (430) proceeds to step 1512, as shown by "yes" line 1510. In step 1512, a determination is made whether the parent device identifies a visible marker or not. If a parent/child relationship is not set, the host module (430) goes to step 1520, as shown by "no" line 1508, which determines whether any tracking device reports a non-visible marker.

At step 1512, if the parent device identifies that a marker is visible, the host module (430) deems that the marker is visible to all the tracking devices and goes to step 1540, which ends the marker tracking and improving process. At step 1512, if the parent device fails to identify the marker, the host module (430) proceeds to step 1516, as shown by "no" line 1514. In step 1516, an analysis is performed on the input from the parent device and improves the visibility of the marker based on the input from the parent device. At step 1516, all the tracking devices track the improved marker and send the tracking results to the host module (430), as shown by line 1517 leading to the start step 1502.

At step 1520, if a non-visible marker is reported by at least one tracking device, the host module (430) proceeds to step 1524, as shown by "yes" line 1522. In step 1524, an analysis is performed of all tracking devices that report a non-visible marker. At step 1576, the host module (430) analyzes the input from all the tracking devices that report a non-visible marker to identify the most possible cause. At step 1526, the host module (430), by analyzing the tracking results, lists all the factors, such as color, shape, size, and pattern, whose value is below a predetermined threshold. The host module (430) further counts the number of tracking devices associated with each cause and identifies the cause that has the highest count as the most possible cause. For example, a system may include four tracking devices. The color of the marker that is deemed lower than a predetermined value may associate with three tracking devices, and the size of the marker that is deemed lower than a predetermined value may be associated with two tracking devices. Therefore, the color is identified by the host module (430) as the most possible cause because it associates with more tracking devices. Once the most possible cause is identified at step 1526, the host module (430) goes to step 1528, which improves the visibility of the marker based on the most possible cause. At step 1528, all tracking devices track the improved marker and send the tracking results to the host module (430), as shown by line 1530 leading to start step 1502.

At step 1520, if all the tracking devices report a visible maker, the host module (430) goes to step 1540, via "no" line 1534, which ends the marker tracking and improving process.

It is also an embodiment of the present invention that the marker could be the size of the entire display screen. For example, in an initial identification process in which the user does not know where the marker is located on an image display, the host, or processor module could cause the entire screen to be a color, such as the color green. Once the user identifies the screen, since it is extremely visible, the processor unit can gradually reduce the amount of green until a much-less visible marker is displayed. Similarly an alarm signal may be used as an audible signal that will alert a user to the location of the output unit (display unit). Once the user has identified the unit, the magnitude of the audible signal can be reduced.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A tracking system for identifying presence of a marker in an image displayed on a display device, the marker including an audio marker, a visual marker and a visual marker with an audio component, the tracking system comprising:
   a processor unit that provides the marker having plural marker parameters;
   an output unit that outputs a representation of the marker superimposed on the image on the display device; and
   a tracker unit, operatively coupled to the processor unit, that identifies the marker parameters relative to the image, on the display device, based upon an algorithm; and
   wherein the processor unit determines a confidence level for each marker parameter, indicating ease of identifying the marker by a user in the image, based on the identification of the marker parameters by the tracker unit such that the processor unit modifies each of the marker parameters based on the determined confidence level for each marker parameter.

2. The tracking system as claimed in claim 1, wherein the processor unit determines the confidence level based on a user input.

3. The tracking system as claimed in claim 1, wherein the processing unit compares the confidence level to a predetermined threshold.

4. The tracking system as claimed in claim 1, wherein the modification includes making the marker less-visible when the confidence level exceeds a predetermined threshold.

5. The tracking system as claimed in claim 1, wherein the modification includes making the marker more-visible when the confidence level is below a predetermined threshold.

6. The tracking system as claimed in claim 1, wherein the one or more marker parameters include: size, color, shape, position, and brightness.

7. The tracking system as claimed in claim 1, wherein the processor unit determines the confidence level based on a learning process.

8. The tracking system as claimed in claim 1, wherein the processor unit stores a history file of the confidence level and associated parameters of the marker.

9. The tracking system as claimed in claim 1, wherein the tracker unit is a microphone unit.

10. The tracking system as claimed in claim 1, wherein the marker includes an audible signal.

11. The tracking system as claimed in claim 1, wherein the marker includes a scannable portion.

12. The tracking system as claimed in claim 1, wherein each parameter of the marker generates an associated component of the confidence level.

13. A method of identifying a marker having plural marker components in an image on a display screen, the marker including an audio marker, a visual marker and a visual marker with an audio component, the method comprising the steps of:
   identifying background parameters of the image on the display screen;
   identifying the marker components relative to the image, on the display screen, based upon an algorithm;
   establishing ease of a user identifying the marker in the image by comparing the background components of the image to each of the marker components;
   comparing each of the established marker components identifiability to a respective threshold; and
   adjusting each marker components based on the comparison.

14. The method as claimed in claim 13, wherein the adjusting step includes making the marker more visible relative to the background of the image.

15. The method as claimed in claim 13, wherein the adjusting includes making the marker less-visible relative to the background of the image.

16. The method as claimed in claim 13, wherein the one or more marker components include: size, color, shape, position, and brightness.

17. The method as claimed in claim 13, further comprising: storing a history file of the confidence level and associated components of the marker.

18. The method of claim 13, wherein the marker components include audible signals.

19. The tracking system as claimed in claim 1, further comprising a plurality of tracker units.

20. The method of claim 13 further comprising:
   obtaining input from a plurality of sources to identify the one or more marker components.

* * * * *